(12) United States Patent
Ordentlich et al.

(10) Patent No.: US 7,433,427 B2
(45) Date of Patent: Oct. 7, 2008

(54) ENHANCED DENOISING SYSTEM UTILIZING INCREMENTAL PARSING

(75) Inventors: Erik Ordentlich, San Jose, CA (US); Gadiel Seroussi, Cupertino, CA (US); Sergio Verdu, Princeton, NJ (US); Marcelo Weinberger, San Jose, CA (US); Itschak Weissman, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 11/000,212

(22) Filed: Nov. 29, 2004

(65) Prior Publication Data

US 2006/0115017 A1    Jun. 1, 2006

(51) Int. Cl.
*H04L 27/00* (2006.01)
*H04L 1/00* (2006.01)
*G06F 11/00* (2006.01)

(52) U.S. Cl. ................. 375/316; 714/746; 714/800
(58) Field of Classification Search ............ 375/316, 375/240.2, 240.27; 340/7.44, 7.41; 341/94; 714/752, 778, 784, 746, 800
See application file for complete search history.

(56) References Cited

U.S. PATENT DOCUMENTS

| | | | | |
|---|---|---|---|---|
| 5,010,554 A | * | 4/1991 | Bechtel et al. | 714/759 |
| 5,533,033 A | * | 7/1996 | Ratner | 714/746 |
| 5,905,739 A | * | 5/1999 | Piret et al. | 714/752 |
| 6,199,186 B1 | * | 3/2001 | Chen et al. | 714/755 |
| 7,047,472 B2 | * | 5/2006 | Weissman et al. | 714/746 |
| 7,120,308 B2 | * | 10/2006 | Guleryuz | 382/254 |
| 2001/0053225 A1 | * | 12/2001 | Ohira et al. | 380/239 |
| 2004/0240545 A1 | * | 12/2004 | Guleryuz | 375/240.2 |

OTHER PUBLICATIONS

Feder et al., Universal Prediction of Individual Sequences, Mar. 5-7, 1991, Proceedings, 17th Convention of Electrical and Electronics Engineers pp. 223-226.*

* cited by examiner

*Primary Examiner*—Mohammad Ghayour
*Assistant Examiner*—Lawrence B Williams (57) ABSTRACT

An apparatus for operating on a received signal that includes a noise-free signal that has been corrupted by a channel is disclosed. A memory stores a channel corruption function specifying the probability that a symbol having a value I was converted to a symbol having a value J by the channel, and a degradation function measuring the signal degradation that occurs if a symbol having the value I is replaced by symbol having a value J. The controller parses one of the received signal or the processed signal into phrases, and replaces one of the symbol having a value I in a context of that symbol in the received signal with a symbol having a value J if the replacement would reduce the estimated overall signal degradation in the processed signal. The context of a symbol depends on the phrase associated with the symbol.

20 Claims, 7 Drawing Sheets

ENHANCED DENOISING SYSTEM UTILIZING INCREMENTAL PARSING

FIELD OF THE INVENTION

The present invention relates to signal processing, and more particularly, to the correction of errors introduced into a signal by the transmission or processing of that signal.

BACKGROUND OF THE INVENTION

The present invention can be more easily understood in terms of a simple exemplary system. Consider a telephone conversation in which a person talks into a microphone whose output is digitized and then transmitted to a second person via various telephone lines and switch systems. The speaker at the second person's location receives a sequence of digital values that are then played back to the second person. In general, the received sequence will differ from the transmitted sequence because of errors introduced by the transmission system, digital-to-analog converters, and analog to digital converters. For example, noise in the transmission system results in some of the digital values in the transmitted sequence being altered. One goal of a denoising system is to remove as many of these noise errors as possible.

The simple example discussed above is an example of a more general problem that is encountered in a wide range of applications. In general, an input digital signal that consists of a sequence of "symbols" is transmitted through a "communication link" and is received as an output digital signal at the output of the communication link. The output digital signal also consists of a sequence of "symbols". Each of the symbols is chosen from a predetermined set of symbols, referred to as an alphabet. For simplicity, the output signal is assumed to be written in the same alphabet as the input signal.

In the simplest case, the signals are binary signals in which the alphabet consists of the symbols "0" and "1". In this case the input and output signals consist of a sequence of 0s and 1s. However, other alphabets are commonly used. For example, a digitized signal in which each symbol is represented by an integer between 0 and M-1 is commonly used in broadband data transmission systems for connecting users to the Internet via a digital subscriber loop (DSL).

While the above examples refer to communication systems, it should be noted that this type of noise problem is present in a number of data processing systems. For example, the storage of data files on a magnetic disk drive can be viewed as the transmission of a digital signal through a communication link, the disk drive. The input signal is a sequence of symbols, e.g., bytes of data, which are chosen from a predetermined alphabet. In the case of byte data, each symbol has an integer value chosen from the set [0,1, . . . ,255]. The retrieved file from the disk drive also consists of a sequence of symbols chosen from this set. The input signal symbols are processed by the electronics of the disk drive and stored in the form of localized magnetic fields that are read to generate the output signal. Noise in the digital to analog circuitry that converts the symbols to and from the magnetic fields introduces errors into the output signal. In addition, the magnetic fields can be altered during storage by random events that introduce additional errors.

In a co-pending patent application, U.S. Ser. No. 10/688, 520, a denoising system is described that utilizes a knowledge of the behavior of the channel and a measure of the amount of degradation that occurs if a symbol is converted by the channel to another symbol. This application is hereby incorporated by reference. In this system, the channel behavior is characterized by a matrix whose entries are the probability that a symbol having the value A is converted to a symbol having the value B. Here, A and B run over all the values in the alphabet used by the channel. This matrix will be referred to as the channel matrix in the following discussion.

This system also assumes that the channel does not have a memory. That is, the probability that a symbol will be erroneously converted to another symbol is independent of the symbols that preceded or followed that symbol. However, this system may still provide advantages if this assumption is not met.

This previously described system alters the received signal in a manner that depends on the frequency with which certain "context" sequences of symbols having predetermined lengths are present in the signal. The received signal is altered in a manner that is estimated to reduce the overall signal degradation in the received signal based on estimates that depend on the channel matrix and the degradation caused when a symbol is wrongfully converted to another symbol.

While this previously described system represents a substantial improvement over other systems it suffers from two problems. First, this system requires that the entire signal be received and analyzed before the denoising algorithm is applied. Hence, the denoising system must have sufficient storage to hold the entire received signal. In addition, the symbols of the corrected sequence are delayed by a time that is at least the time required to receive the entire signal. For a very long signal, the needed storage and delays are often unacceptable.

The second problem relates to choosing the length of the context sequences. In the simplest case, this denoising system generates a table of the frequency with which all sequences of a specified length, K, occur in the signal. The denoising algorithm's success depends to some degree on K. If K is too small, the number of noise errors that can be corrected is less than the optimum number. If K is too large, the statistical accuracy of the frequency data is too low to make accurate denoising decisions. That denoising algorithm attempts to overcome these problems to find the best K value by utilizing an estimate for K based on some statistical assumptions that are often, but not always true, or by recording the frequencies for sequences having a number of different K values and utilizing different K values for different sequences in the received signal.

SUMMARY OF THE INVENTION

The present invention includes an apparatus and method for operating on a received signal that includes a noise-free signal that has been corrupted by a channel to generate a processed signal. The apparatus includes a memory and a controller. The memory stores a channel corruption function specifying the frequency of errors introduced by the channel and a degradation function that measures the degradation resulting from changing a symbol having the value I to a symbol having a value J. The controller parses one of the received signal or the processed signal into phrases and generates the processed signal. The controller changes one of the symbols from a value of I to a value of J in a context of that symbol if the replacement would reduce the estimated overall signal degradation in the processed signal relative to the noise-free signal as measured by the signal degradation function and an observed frequency of the context followed by each possible symbol value. The context includes a sequence from the beginning of a phrase associated with that symbol to a symbol in that phrase corresponding to that one of the symbols.

DETAILED DESCRIPTION OF THE PREFERRED EMBODIMENTS OF THE INVENTION

The present invention provides a method for reducing the signal degradation resulting from the noise that is introduced into a digital signal when the signal is processed by a system that introduces noise errors. The processing system that introduces the noise will be referred to as the "channel" in the following discussion because such a system is analogous to a transmission channel over which the signal is sent.

Figure 1:
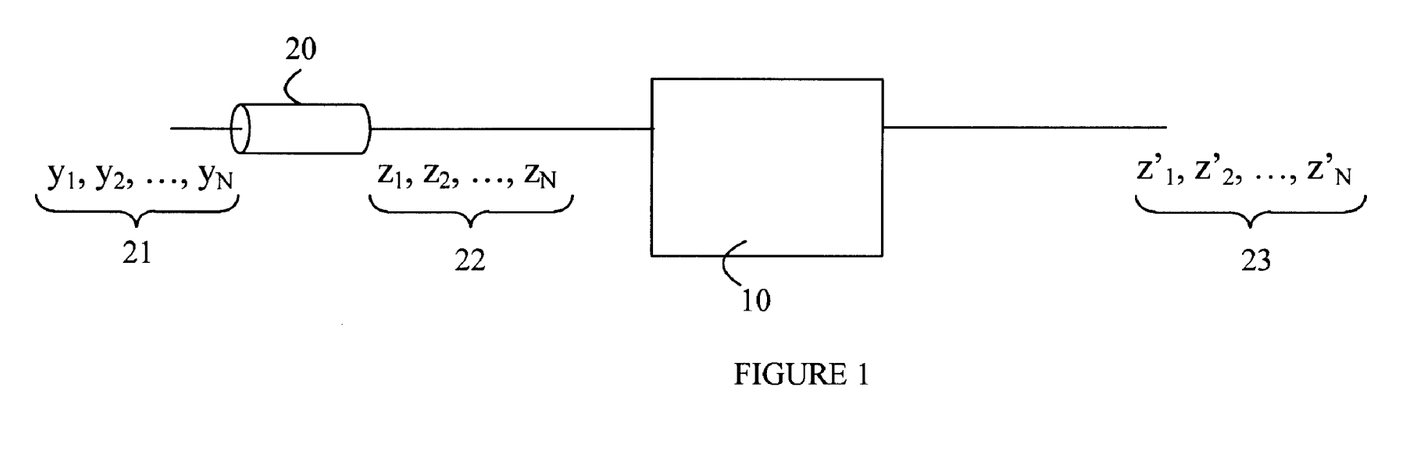
FIG. 1 illustrates a block diagram of a denoising system 10 operating on a signal that has been corrupted.

Refer now to FIG. 1, which illustrates the nomenclature used in this discussion relative to a block diagram of a denoising system 10 operating on a signal that has been corrupted by a channel 20. The channel operates on an input signal 21 comprising a sequence of symbols, $y_i$, for i=1 to N, from a known alphabet to generate an output signal 22, $z_i$ for i=1 to N, that also comprises a sequence of symbols from that alphabet. To simplify the following discussion, it will be assumed that the alphabet in question consists of M symbol values from 0 to M-1.

For the purposes of this discussion, it will be assumed that the channel does not have a memory. That is, the probability that a symbol having value A in the input signal will be converted to a symbol having a value B in the output does not depend on the symbols that preceded and/or followed that symbol. In this case, the channel's error behavior can be approximated by a single matrix P, where P(I,J) is the probability that a symbol having the value I will be converted to a symbol having the value J. It will be assumed that P, or an approximation thereof, is known.

For the purposes of this example, it will also be assumed that there is a quantified measure of the degradation introduced into the output signal by replacing a symbol having the value A in the input signal by a symbol having the value B in the output signal. The degradation may be different for different values of A and B. In the following discussion this degradation measure will be referred to simply as the "degradation" and denoted by D(A,B). Again, it is assumed that D, or some approximation thereof, is known.

It should be noted that in systems that utilize an alphabet that contains more than two symbols, D(A,B) will often depend on the difference between A and B. For example, consider a digital signal that is generated by converting an analog time varying signal to a sequence of digital values utilizing an 8-bit analog-to-digital converter. The resulting digital signal is a sequence of symbols chosen from an alphabet having 256 symbols corresponding to the digital values 0 through 255. Assume that the output signal is to be converted back into an analog signal and played back to a human observer. The error in the output signal resulting from a symbol being altered by 1 is usually much less than the error resulting from a symbol being altered by 2, and so on. Hence, the degradation function will depend on the amount by which the symbol is changed as well as the symbol in this case.

Referring again to FIG. 1, the denoising system described in the above-referenced U.S. patent application attempts to identify symbols that have a high probability of having been changed by the channel. These symbols are then altered to produce a denoised output signal 23 in which the overall signal degradation as measured by the degradation function is estimated to be reduced. If the symbols in the output signal are considered one at a time, very little information can be obtained with respect to the probability that any particular symbol is in error if the symbols appear with approximately equal frequencies in the input signal. If one assumes that the various symbol values have equal frequencies in the input signal, the frequencies with which the symbols appear in the output signal will also be approximately equal in most cases of interest. Consider a binary signal that passes through a channel in which the probability of converting a 1 to a 0 is the same as the probability of converting a 0 to a 1. If there were approximately equal numbers of 1s and 0's in the input signal, the output signal will also have approximately equal numbers of 1s and 0s, since, for every 1 that is converted to a 0 by the channel, there will also be, on average, a 0 that is converted to a 1. Hence, one cannot identify any particular symbol that is more likely to be the result of noise than any other symbol.

The present invention, like the invention described in the above-referenced patent application, is based on the observation that improvements in the output signal can be made if one "symbol" value is very rare compared to another "symbol" value. For example, suppose that symbol A occurs very rarely in the input signal compared to symbol B, and that channel errors result in A being converted to B and B being converted to A. Also assume that the probability of A being converted to B is the same as that of B being converted to A; denote this probability by P. It is assumed that P is known. Denote the number of symbols in the input signal having the values of A and B by $N_A$ and $N_B$, respectively. Denote the number of symbols in the output signal having the values of A and B by $N'_A$ and $N'_B$, respectively. It should be noted that only $N'_A$ and $N'_B$ are available to the denoiser. The number of symbols having the value A in the output signal is equal to the number of symbols having the value A in the input signal less the number of symbols having the value A that were converted to another symbol plus the number of symbols having some other value that were converted to A. To simplify the discussion, consider the case in which A and B are the only two symbols in the alphabet. Then, $$N'_A \approx N_A - P*N_A + P*N_B$$

and $$N'_B \approx N_B - P*N_B + P*N_A,$$

where the error in the approximations after dividing/normalizing by the total number of counts is small with high probability, especially as the number of symbols becomes large. Throughout this document, when errors in approximations or estimates of unnormalized symbol counts are said to be "small" or quantities involving unnormalized symbol counts are said to be "close" to one another, it is to be understood that the relevant errors are small, not necessarily on an absolute scale, but are small relative to the total number of symbols, or, in other words, are small after dividing/normalizing by the total number of symbols in the signal.

To simplify the following discussion, it is assumed that the above approximations have zero errors or that the equality holds. Thus, given P, $N'_A$, and $N'_B$, the above system of equations (with ≈ replaced by =) can be solved for $N_A$ and $N_B$ to yield estimates of the number of occurrences of A and B, respectively, in the input sequence. We shall denote these estimates of the counts of A and B respectively by $n_A$ and $n_B$. Note that their counterparts, $N_A$ and $N_B$, which denote the actual counts in the input sequence, are unavailable to the denoiser in the envisioned applications. In this example, we assume that $N_A<<N_B$ and that $P<<1$; hence, $N'_A$ is approximately equal to $N_A+P*N_B$ and $N'_B$ is approximately equal to $N_B$. In this case, it can be seen that the channel errors increase the frequency of the rare symbol. The $N'_A$ symbols in the output signal can be viewed as consisting of two classes of symbols. The first class consists of symbols that were correctly transmitted by the channel, and the second class consists of symbols that were incorrectly transmitted in a manner that converted symbols of value B to symbols of value A.

If one could ascertain to which class each symbol having the value A belonged, the symbols that were in the second class could be converted back to B and the errors corrected. Unfortunately, there is no way of making this determination. There are two other possible actions, do nothing or convert all As back to Bs. The present invention performs the action that results in the least estimated signal degradation as measured by D(A,B).

Consider a case in which the signal degradation associated with converting an A to a B is the same as that associated with converting a B to an A, i.e., $D(A,B)=D(B,A)=D$. The output signal has approximately $PN_B \approx N'_A - N_A$ errors resulting from the conversion of a B to an A by the channel. If nothing is done about these errors, a total signal degradation of $(N'_A-N_A)D$ will be present in the output signal. The estimated signal degradation is taken to be $Pn_B D$, which in this example is also well approximated by $(N'_A-N_A)D$.

Suppose all of the symbols having value A in the output signal are set to B. This will correct the $N_A'-N_A$ errors resulting from changing B to A. This change will also introduce approximately $(1-P)N_A \approx N_A$ new errors into the output signal because the $N_A$ symbols that are correctly represented as As in the output signal are converted to Bs while approximately $P*N_A$ Bs that turned into As are converted back to Bs.

Note that if $(N'_A-N_A)D>N_A*D$, then setting all As in the output signal to Bs will reduce the overall signal degradation. Accordingly, if $N'_A>2N_A$, all of the As should be converted to Bs in this example. As $N_A$ and $N_B$ are unknown in practice, the algorithm of the present invention applies an approximation of this decision rule obtained by replacing $(N'_A-N_A)$ and $N_A$ by the respective estimates $Pn_B (\approx N'_A-n_A)$ and $(1-P)n_A (\approx n_A)$.

This simple example assumes that the input and output signals are composed of symbols in which the symbol A was very rare compared to the symbol B. While the algorithm can be applied to the case in which the symbols have approximately equal frequencies, the application of the algorithm in that case will almost always result in the symbols of the output signal being left unchanged.

Figure 2A:
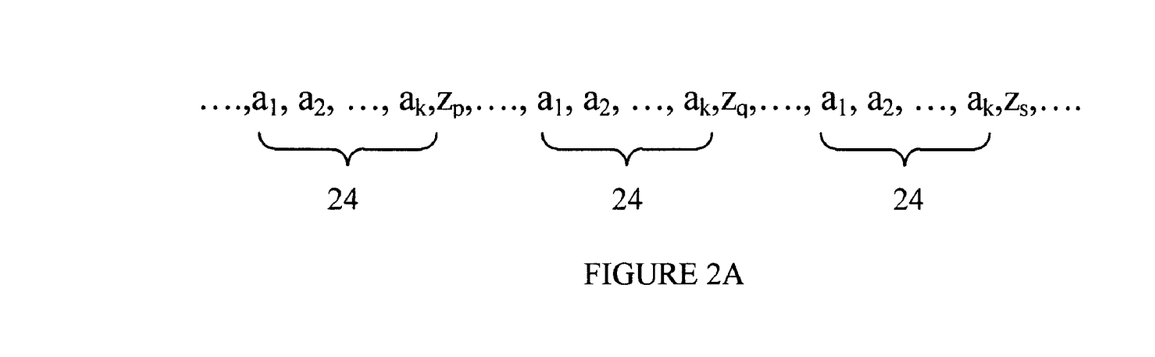
FIG. 2A illustrates a portion of an output signal.

While the frequencies of the individual symbols in the output signal may have substantially equal numbers, there are often repeated short runs of symbols that can be used to construct "super symbols" that have very different frequencies. Consider a system in which the symbols of the input and output signals are chosen from an alphabet having M values. Referring to FIG. 2A, which illustrates a portion of the output signal, wherein a sequence of symbols $a_1, a_2, \ldots, a_k$ in which the $a_i$ is fixed is shown as appearing at a number of locations 24 in the output signal. The sequence $a_1, a_2, \ldots, a_k, x$, where x is the next symbol after the sequence can be viewed as a "super symbol" that can take on M values that are determined by the value of x. If a sequence $a_1, a_2, \ldots, a_k$ can be found for which $a_1, a_2, \ldots, a_k, x$ occurs much less frequently than the sequence $a_1, a_2, \ldots, a_k, x'$ for some value of x and x', then a generalization of the algorithm used in the above discussion above can be applied to improve the overall signal degradation.

Consider a symbol in the output signal. A sequence of symbols having fixed values and in a predetermined location with respect to that symbol will be referred to as the "context" of that symbol. For example, the sequence $a_1, a_2, \ldots, a_k$ discussed above is a context of the symbol x if the sequence $a_1, a_2, \ldots, a_k, x$ appears in the output signal. It should be noted that the symbol x may appear in a large number of different contexts. It will be assumed that the context of the symbol $z_j$ in the output signal is the k symbol to the left of that symbol in the sequence of output symbols.

Consider a particular symbol $z_j$ in the output signal. The context of that symbol is the sequence $[z_{j-k} \ldots z_{j-2}, z_{j-1}]$. That is, $a_1=z_{j-k}$, $a_2=z_{j-k+1}$, and so on. To simplify the following discussion, the sequence of values $a_1, a_2, \ldots, a_k$ will be denoted by the vector a. The algorithm counts the number of times the context a followed by the value x is found in the output signal for each value of x from 0 to M-1. From the observed counts, the number of occurrences of the context followed by each possible x value in the original signal, $y_i$, can be estimated using the known error rates for the channel. Once these estimates are determined, a decision to reset all sequences of the form a,x to a,x' can be made based on the known degradation function in a manner analogous to that described above.

Figure 2B:
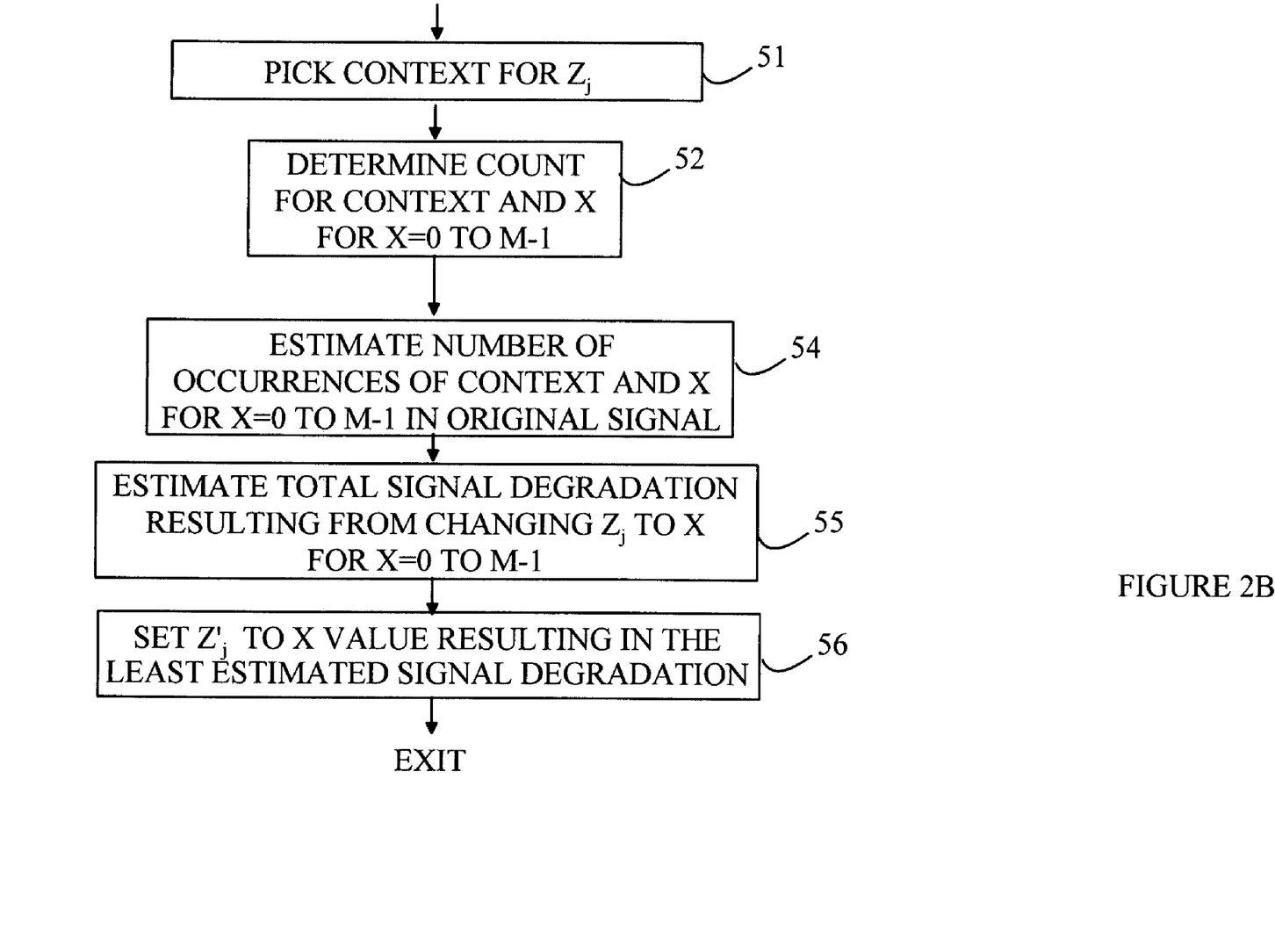
FIG. 2B is a flow chart of the denoising system utilized in the present invention once a context has been defined.

Refer now to FIG. 2B, which is a flow chart of the denoising system utilized in the present invention and the above-described patent application. Given a symbol $z_j$ that is to be processed, a context is determined for that symbol by examining the sequence of symbols to the left of that symbol as shown at 51. The number of occurrences, N'(x), of a,x in the output signal for each value of x from 0 to M-1 is then determined as shown at 52. The probability matrix, P, is then used to estimate the number of occurrences N(x) of a,x in the input signal for x from 0 to M-1 as shown at 54. Let n(x) denote these estimates which satisfy the system of equations (expressed in matrix notation)

$$N'=nP, \qquad (c)$$

where N' and n are M-dimensional row vectors with components consisting, respectively, of the counts N'(x) and n(x), for x=0 and M-1, and P is the channel probability matrix defined above. Therefore, we express n(x) as $$n=N'P^{-1}, \qquad (d)$$

where $P^{-1}$ is the matrix inverse of P. Using D(I,J), the estimated total signal degradation that would occur if all instances of a,q are replaced by a,x for each possible value of x, where $q=z_j$ is then determined as shown at 55. The case in which x=q corresponds to the case in which the sequences are left unchanged. Replace $z_j$ by p where p is the value of x for which the estimated total signal degradation is minimized.

If all instances of a,q are left unchanged, the signal degradation will be the sum of the contributions from each possible value of a,x that was converted to a,q erroneously by the channel. The contribution from a,x is the number of errors times the degradation arising from each error. The number of erroneous a,q arising from a,x is, with high probability, close to N(x)P(x,q) which is estimated to be n(x)P(x,q). The degradation arising from each error is D(x,q). Hence, the estimated degradation of the signal if nothing is done is the sum of $n(x)P(x,q)D(x,q)$ over all x values different from q. Consider the degradation that occurs if all instances of a,q are converted to a,p. Some of the instances of a,q are the result of the channel converting instances of p with output signal context a to q. Hence, the conversion of all instances of a,q to a,p will correct these. The remaining instances of a,q that are converted to a,p will be errors. Hence, the total degradation resulting from converting all instances of a,q to a,p is estimated as the sum of $n(x)P(x,q)D(x,p)$ over all x values that are different from p, where, again $n(x)P(x,q)$ is an estimate of $N(x)P(x,q)$, which, in turn, is expected to be close, with high probability, to the number of occurrences of q having context a that were originally x in the input signal. The value of p that minimizes the estimated degradation is selected to replace q as shown at 56. The minimizing value could very well be q, which would amount to leaving a,q unchanged.

The manner in which the present invention identifies the context and computes the counts needed to apply the above-described algorithm in processing each $z_j$ will now be discussed in more detail. The present invention depends on a parsing of the sequence $z_j$ into "phrases". The parsing of the sequence is performed starting from the beginning of the sequence in a recursive manner. The phrases that have been defined to date are stored in a dictionary. The next phrase to be placed in the dictionary is the shortest sequence of symbols that begins with the symbol following the last phrase that is not in the dictionary.

Figure 3:
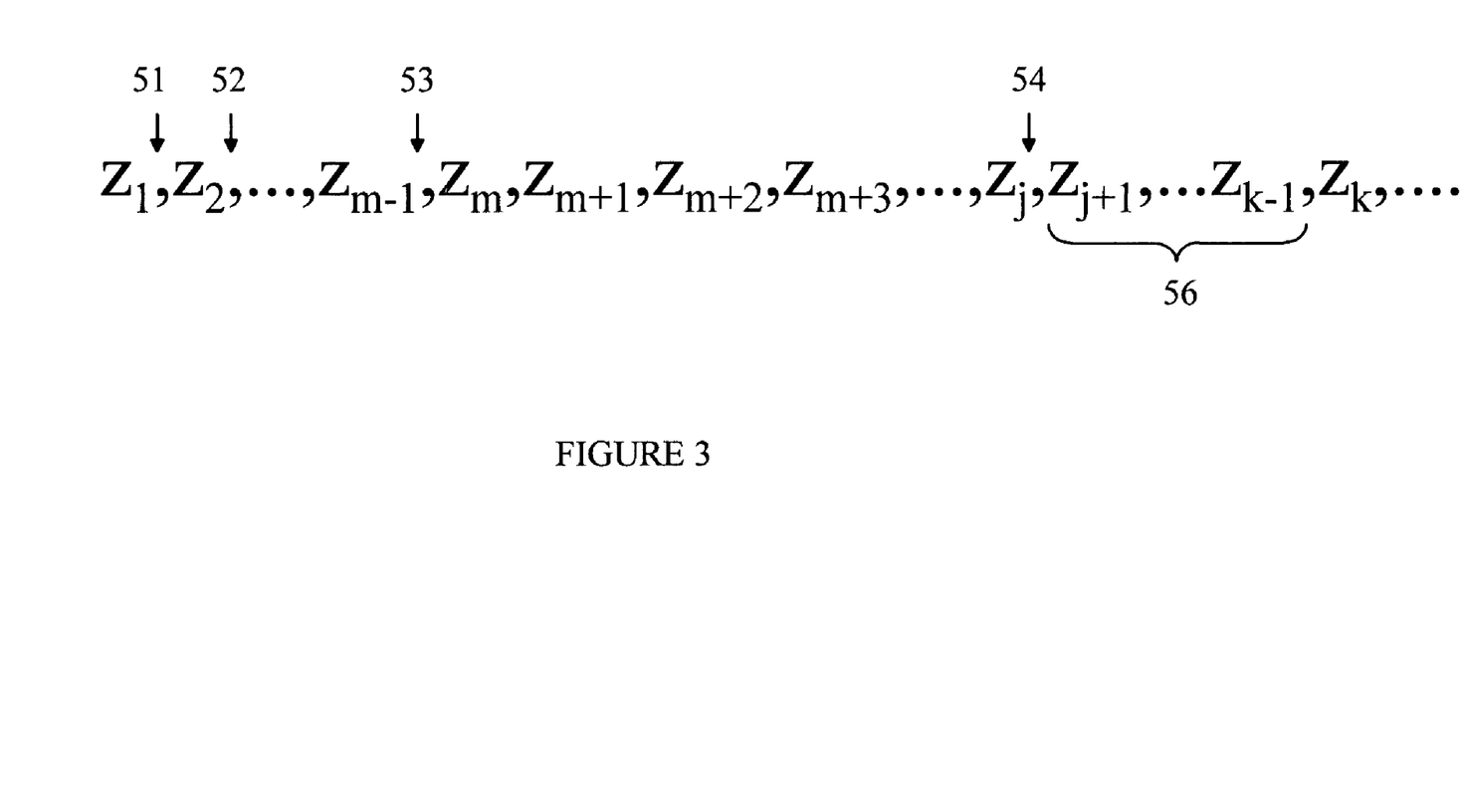
FIG. 3 illustrates an input sequence that has been parsed into phrases.

Refer now to FIG. 3, which illustrates the input sequence $z_j$ in which a number of phrase boundaries are marked by the arrows labeled 51-54. Since the dictionary is empty at the start of the parsing process, the first phrase consists of the single symbol $z_1$. The next phrase will either be $z_2$ or $z_2,z_3$. If $z_2$ is different from $z_1$, then $z_2$ will be the next phrase since it is the shortest sequence that is not in the dictionary. If $z_1=z_2$, then $z_2$ is already in the dictionary, and hence, the next larger sequence is considered, i.e., $z_2,z_3$. In the example shown in FIG. 3, the second phrase is the single carrier $z_2$. As the process proceeds, the new phrases will eventually increase in size if the sequence is long enough.

Consider the case in which symbol $z_k$ is being processed by the denoising algorithm, and assume that the last phrase to be defined prior to reaching $z_k$ ended at $z_j$ as shown by the arrow at 54. The context used to denoise $z_k$ in the present invention consists of the symbols to the left of $z_k$ starting with the first symbol of the phrase in which $z_k$ appears as shown at 56. That is, the context is the sequence $z_{j+1}, z_{j+2}, \ldots, z_{k-1}$.

The denoising processes can be carried out concurrently with the parsing of the input sequence into phrases. If the sequence $z_{j+1}, z_{j+2}, \ldots, z_{k-1}, z_k$ is not in the dictionary, then this sequence is a new phrase to be added to the dictionary and a marker is placed after $z_k$ to denote that the subsequent symbols are part of the next phrase. If the sequence is in the dictionary, k is merely incremented and the sequence ending with $z_{k+1}$ is tested after denoising $z_{k+1}$. Hence, as each symbol is received, the phrase dictionary and phrase markers can be defined and the symbol denoised before proceeding to the next symbol.

In principle, the methods for carrying out the denoising can be divided into two classes. In the first class, only the portion of the signal that has been received prior to $z_j$ is considered. In the second class, all of the contexts seen in the entire signal are considered. The first class has the advantage of allowing the denoised value for $z_j$ to be output with, at most, a small delay relative to the time $z_j$ is received by the denoising apparatus. This class of algorithm, however, has less statistical precision than algorithms of the second class, since the denoising decisions are made on only a subset of the entire signal. The second class, while providing increased statistical precision, introduces a delay of at least the time needed to receive the entire signal.

Methods for implementing the first class of algorithms will now be discussed in more detail. In principle, the portion of the signal received to date could be stored and the frequencies with which the context corresponding to $z_k$ occurred followed by each possible symbol value could then be determined by searching this stored sequence. However, the storage space and computational load inherent in this approach can be excessive.

In one embodiment of the present invention, this storage and computational workload is reduced by utilizing a tree-structured database to store information about the sequences encountered at any point in the received signal. The tree-structured database also stores information that allows the number of occurrences of each context followed by each possible next symbol to be ascertained. The database is built as the noisy symbols are received. Hence, the information needed to process a noisy symbol $z_j$ is available when the symbol is received, and hence, the symbol can be processed without waiting for the remainder of the noisy signal.

Figure 4:
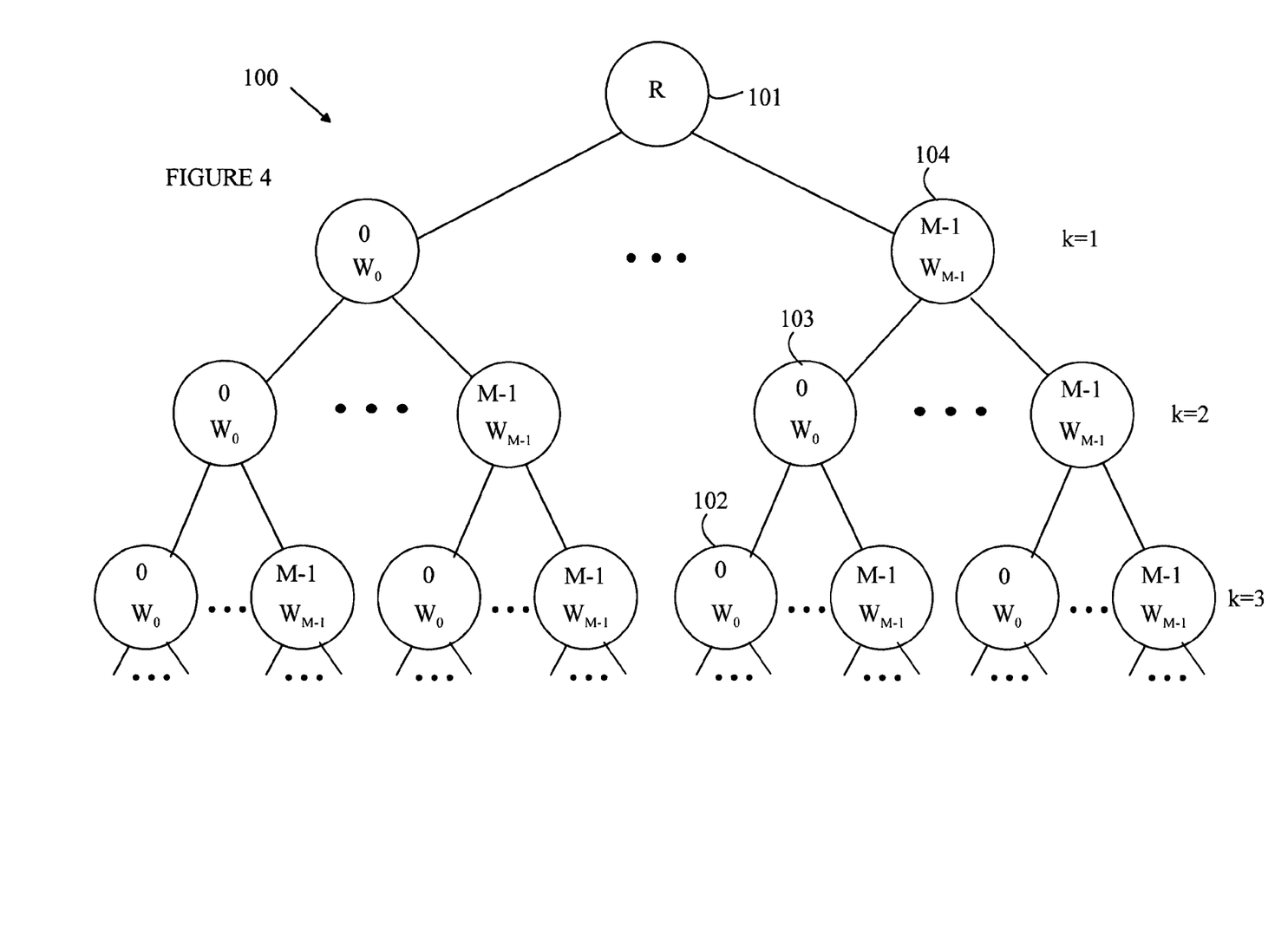
FIG. 4 illustrates a tree-structured database 100 that can be used in the present invention.

Refer now to FIG. 4, which illustrates a tree-structured database 100 that can be used in the present invention. For the purposes of this discussion, the number of symbols in the alphabet will be denoted once again by M. For simplicity, each symbol in the noisy signal is assumed to be represented by an integer value chosen from the set consisting of the integers from 0 to M-1. Database 100 is divided into levels that are labeled by corresponding values of k. Three levels are shown in the figure. Each level includes $M^k$ nodes. Each node represents a string of symbols that ends with the symbol value assigned to that node. Hence, the M nodes at level 1 correspond to the M possible one symbol sequences the context a could assume. For each node at level k=1, there are M corresponding child nodes at level k=2 that are connected to that node, and so on. Each node is characterized by a unique label, a weight value W and a symbol value S that is equal to the value of the last symbol in the sequence corresponding to that node. The tree has a root node 101 that does not correspond to any symbol. The manner in which the root node is utilized will be explained below.

Figure 5:
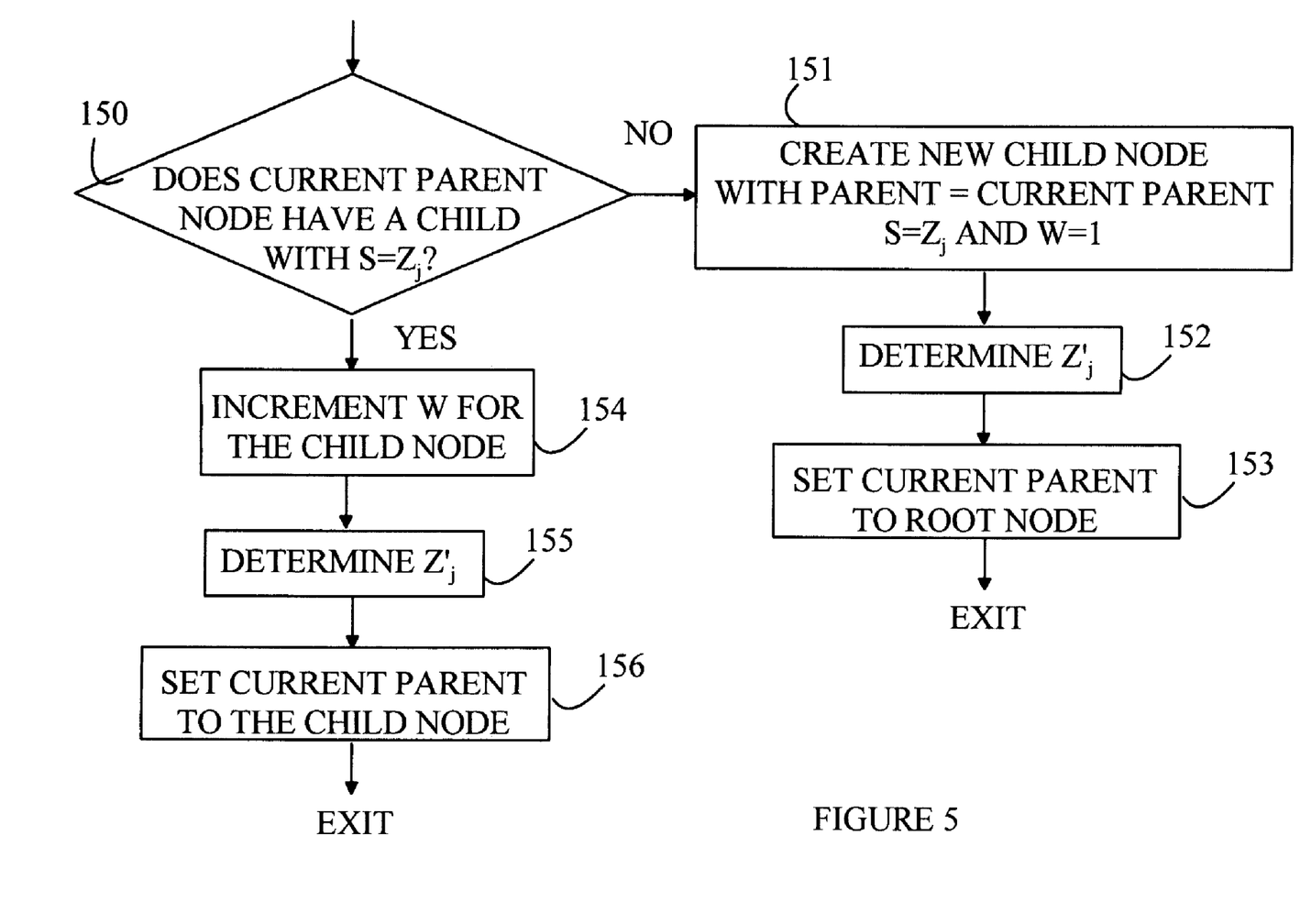
FIG. 5 is a flow chart of a tree update algorithm that is executed when a new symbol $z_j$ is received.

While the representation of tree-structured database 100 shown in FIG. 4 shows all of the possible nodes, it is to be understood that the nodes are only created as needed to reduce the amount of storage needed. The manner in which the nodes are created and the weights adjusted may be more easily understood with reference to FIG. 5, which is a flow chart of a tree update algorithm that is executed when a new symbol $z_j$ is received. At any point in the process, a parent node is defined. The algorithm starts by defining the current parent node to be the root node and assigns the label corresponding to the root node to the parent node. For each $z_j$, the algorithm operates as shown in FIG. 5. First, the child nodes of the current parent node are examined to determine if a child node exists for the symbol value $z_j$ as shown at 150. If no such node currently exists, a new child node is created and initialized as shown at 151. The initial weight value is set to one in the initialization. The denoised symbol $z'_j$ is then determined in the manner described below as shown at 152. The parent node is then set to the root node as shown at 153. The algorithm is then finished with the current symbol and exits to await the receipt of the next symbol.

If a child node corresponding to a symbol value of $z_j$ is found for the current parent, the weight stored in that child node is incremented as shown at 154. The denoised symbol $z'_j$ is then determined in the manner described below as shown at 155, and the current parent node is set to the child node in question as shown at 156. The algorithm is then finished with the current symbol and exits to await the receipt of the next symbol.

Consider the case in which the current parent has a child node $z_j$. When the next noisy symbol is processed, the current parent represents the current phrase. Refer again to FIG. 4. Assume that the current parent is node 102. When the next $z_j$ is processed, it will correspond to a child node of this parent. This node will have been reached by moving from the root node through nodes 104 and 103 during the processing of the previously received symbols.

Finally, it should be noted that the weights associated with each of the child nodes of the current parent represent the number of times the symbol following the parent node was found to be the symbol corresponding to each of the children. Hence, the weights provide the number of times the context specified by the parent node was followed by each of the possible symbols in the alphabet. This is precisely the data needed to perform the denoising operation discussed above.

Hence, the signal can be denoised at the same time the tree is being computed. After the child node corresponding to a symbol is processed in the tree building procedure discussed above, the current parent node is examined to determine the weights associated with each child node. The weights in question are then used as the N' vector (with N'(x) set to the weight W of child node x if there is such a child node and to zero otherwise) in the denoising operation discussed above to determine the symbol to be output by the denoising system. Since the tree is updated as each symbol is received, the new denoised symbol can also be computed at that time, and hence, the denoised symbol can be output with a delay that is determined by the time needed to update the context tree and perform the denoising operation.

It should be noted that the denoising decision is based on the tree as it exists immediately after the current symbol is received. The current symbol is replaced if replacing all instances of the symbol preceded by the context defined by the parent node would have resulted in less total signal degradation based on the counts associated with the parent node at the time of replacement. The current symbol in the context in question may have been processed earlier in the input sequence using the tree as it existed when that instance was received with a different result, since the counts at the parent node at that time may have resulted in a different choice of replacement symbol for the current symbol. Since the earlier symbol will have already been outputted, this class of denoising system does not alter the prior decisions. Similarly, the next time the current symbol is encountered after the context in question, an independent determination of the replacement symbol will be made that could differ from the current determination.

The tree-structured database can also be used in a two-pass denoising system. In the first pass, the noisy signal is received and stored in a memory in the denoising system. At the same time, the tree-structured database is constructed in the manner described above, except that steps 152 and 155 are not performed.

Figure 6:
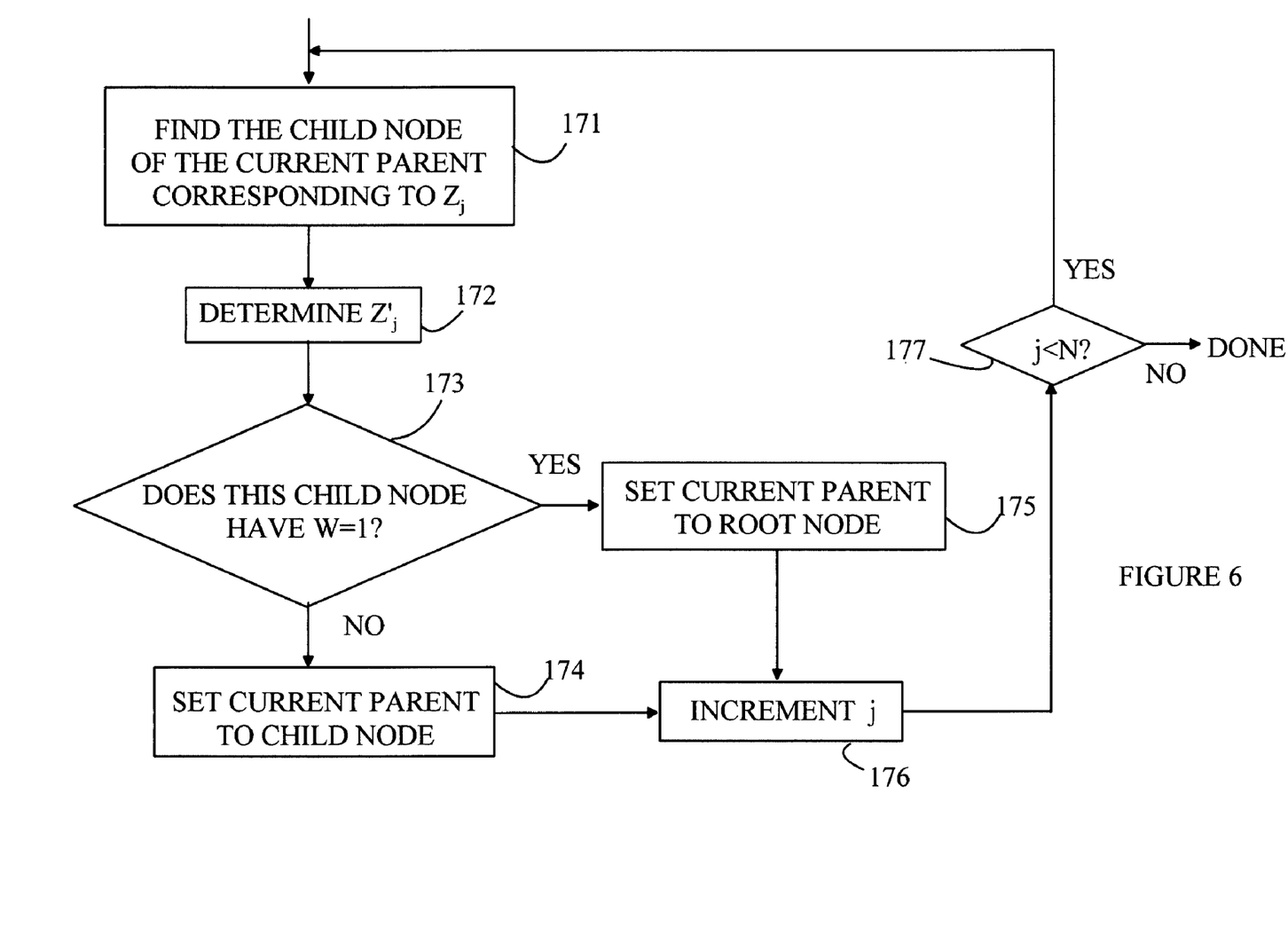
FIG. 6 is a flow chart of the algorithm executed in the second pass.

In the second pass, the algorithm moves through the stored signal sequentially and traverses the tree but without updating the weights. Refer now to FIG. 6, which is a flow chart of the algorithm executed in the second pass. The stored signal is accessed in sequence starting with j=1. The current parent is initially set to the root node. The algorithm starts by finding the child node of the current parent corresponding to a symbol value of $z_j$ as shown at 171. The denoised symbol $z'_j$ corresponding to $z_j$ is then computed as discussed above as shown at 172. If the child node had a weight of one, it could not be the first symbol of the context for $z_{j+1}$, since it was visited only once during the first pass. Hence, the weight of the child node is examined as shown at 173. If the weight was equal to one, the current parent is reset to the root node as shown at 175. If the weight is greater than one, the current parent is set to the child node in question as shown at 174. Once the current parent has been defined for processing the next symbol, j is incremented as shown at 176. If j<N the algorithm loops to process the next symbol as shown at 177, otherwise the algorithm terminates.

The two-pass embodiment has the advantage of providing better statistics since the weights represent the total number of times the corresponding context appears in the noisy signal, not just the number of times the context has been seen prior to receiving the symbol being denoised. However, the two-pass system requires sufficient storage to store the entire signal, and the two-pass embodiment suffers from the delays discussed above. It should also be noted that the two-pass embodiment might provide a somewhat different result, since the tree used to denoise all of the signals is the same for all symbols, i.e., the tree used to denoise the last symbol in the one-pass embodiment.

Embodiments that incorporate the improved statistical accuracy of the two-pass embodiments described above and the shorter delays inherent in the one-pass embodiments can also be constructed. Consider a denoising problem in which the signal to be denoised is very long. The statistical precision of the tree-structured database is initially poor; however, the statistical precision of the database improves as more and more of the symbols are received. At some point, the increased statistical precision is high enough that further increases in the precision do not lead to significantly different denoising decisions. At this point, the advantages of the one-pass approach will often outweigh the benefit of any increase in precision. Hence, an embodiment in which the first part of the signal is used to build the database prior to processing that part of the signal might have advantages with very long signals.

One embodiment of such a hybrid system operates by dividing the processing of the signal into three phases. In the first phase, the signal is processed in a manner analogous to the first-pass of the two-pass system described above. That is, as each symbol is received, the symbol is stored in a memory in the denoising apparatus and the symbol is used to build the tree-structured database. When sufficient symbols have been received, the system switches to the second phase. In the second phase, the stored symbols are denoised using the algorithm described above with reference to the two-pass system. When the symbols that were used to build the initial database are processed, the system switches to the algorithm used in the one-pass system with the initial "current parent" being set to the node identified as the current parent after the last stored symbol was denoised. In this third phase, the database weights are updated and the symbols denoised in the manner described above with reference to the one-pass system. Since the denoising apparatus will have a backlog of symbols to denoise at the end of the first phase, some additional memory might be needed to store the signal symbols that are received during the second phase.

In this embodiment, there is an initial delay equal to the time needed to receive and store the symbols used to build the database during the first phase. The first denoised symbol is available after this initial delay plus the time needed to denoise the first symbol. If the denoising apparatus is capable of denoising a symbol in a time that is less than the time between the receipt of successive symbols, the apparatus will eventually catch up with the backlog of symbols that were stored during the first and second phases. At this point, the delay will return to being that associated with each symbol in the one-pass system.

Figure 7:
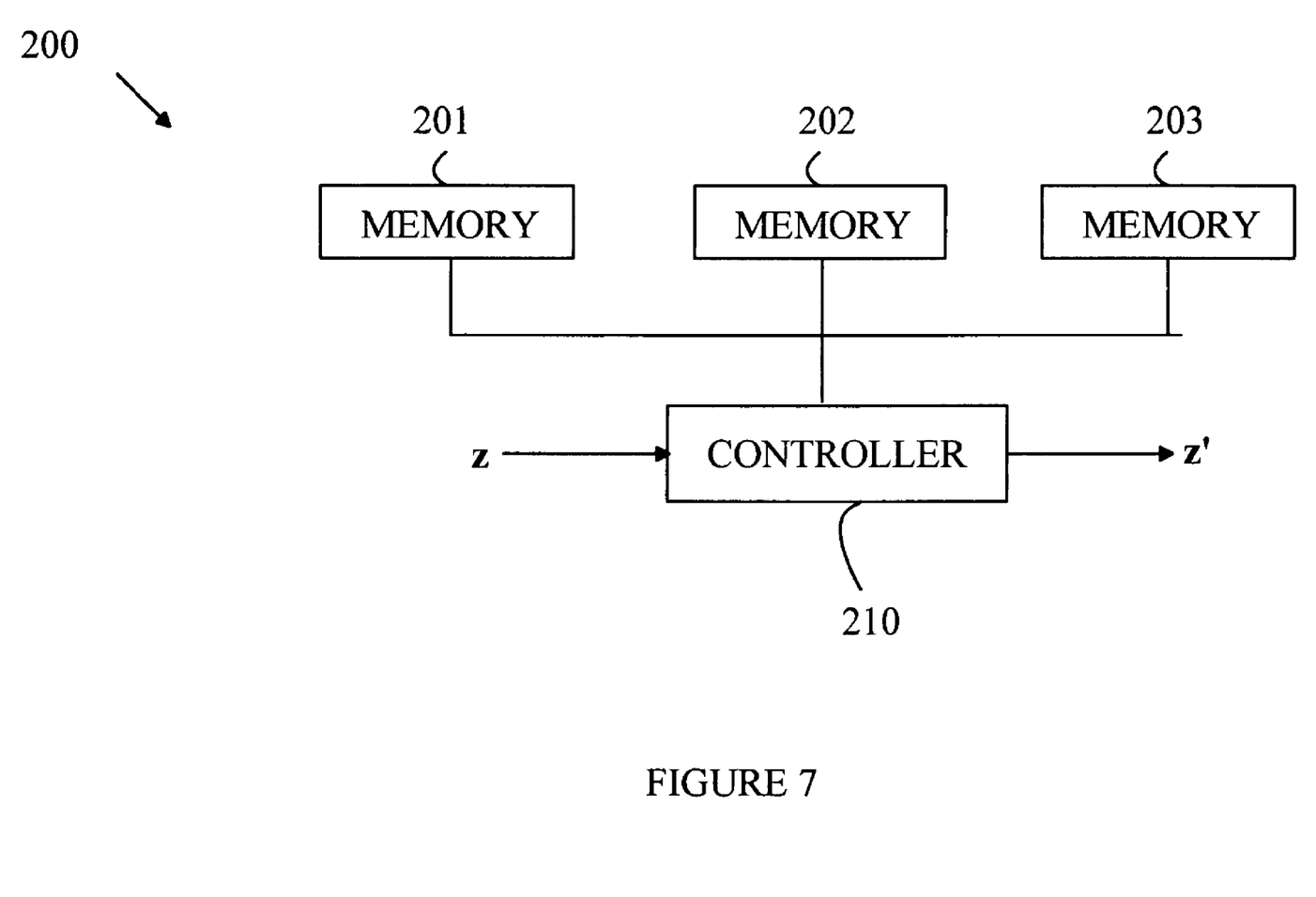
FIG. 7 is a block diagram of one embodiment of a hardware system for implementing the present invention.

The denoising algorithms discussed above can be implemented on a general-purpose data processing system or on specialized systems. Refer now to FIG. 7, which is a block diagram of one embodiment of a hardware system for implementing the present invention. Denoising system 200 includes a memory 201 for storing the degradation function D(A,B) discussed above and the channel matrix P. In addition, denoising system 200 includes a memory 202 for storing the tree-structured database discussed above. If an embodiment of the present invention that requires the storage of all or part of the signal is implemented, a memory 203 is also included. Finally, denoising system 200 includes input and output ports for receiving the noisy signal and outputting the denoised signal, respectively and a controller 210 for performing the various denoising computations discussed above. As noted above, denoising system 200 can be implemented on a general-purpose data processing system. In such embodiments, the memories shown in FIG. 7 can be implemented as separate areas of the data processing systems memory or disk drive storage systems.

The above-described embodiments utilize a context that is defined in the noisy sequence $z_1, \ldots z_j \ldots z_N$, where N is the number of symbols in the received signal. That is, the tree is built using the received sequence without taking into account the denoised value assigned to each received symbol. However, embodiments that define the contexts in terms of the denoised sequence can also be implemented. In such an embodiment, the tree differs from the structure described above in two respects. First, the tree is constructed using the denoised values, $z'_j$ rather than the received sequence values $z_j$. That is, the tree-building algorithm moves from the current parent node to the child node corresponding to the denoised value $z'_j$ instead of $z_j$. Hence, each node in the tree now corresponds to the current phrase in the sequence $z'_j$.

The second change involves the weight functions. The denoising algorithm requires a count of the number of times each context is followed by each of the possible values of $z_j$. If one were merely to build a tree using the sequence of $z'_j$ values as described above, the weights at each of the nodes would correspond to the number of times the sequence ending in $z'_j$ represented by the node was encountered. Hence, the weights must be set to the number of times the context defined by the current parent node was followed by the value $z_j$ for each of the M possible values of $z_j$. This count can be stored in an array in each node or by incrementing the counts in the child nodes based on the value of $z_j$ rather than $z'_j$.

Various modifications to the present invention will become apparent to those skilled in the art from the foregoing description and accompanying drawings. Accordingly, the present invention is to be limited solely by the scope of the following claims.

What is claimed is:

1. An apparatus for generating a processed signal from a received signal comprising a noise-free signal corrupted by a channel, said apparatus comprising:

a memory that stores a channel corruption function specifying the frequency of errors introduced by said channel and a degradation function measuring the degradation resulting from changing a symbol having the value I to a symbol having a value J; and a controller that parses said received signal into phrases and generates said processed signal, said controller changing one of said symbols from a value of I to a value of J in a context of that symbol if said replacement would reduce the estimated overall signal degradation in said processed signal relative to said noise-free signal as measured by said signal degradation function and an observed frequency of said context followed by each possible symbol value, said context including a sequence from the beginning of a phrase associated with that symbol to a symbol in that phrase corresponding to that one of said symbols.

2. The apparatus of claim 1 further comprising a memory for storing a database having information specifying parsed sequences of symbols that have been received prior to said one of said symbols.

3. The apparatus of claim 2 wherein said database comprises a tree-structured database in which each node represents a sequence of symbols that ends on that node.

4. The apparatus of claim 2 wherein said database is updated as said symbols in said received signal are received and each symbol is processed before a subsequent symbol in said received signal is received.

5. The apparatus of claim 2 wherein said controller replaces said symbol after all of said received signal has been received.

6. The apparatus of claim 1 further comprising a memory for storing at least a portion of said received signal.

7. A method for processing a received signal comprising a noise-free signal that has been corrupted by a channel to generate a processed signal, said method comprising:

storing channel corruption information specifying the frequency of errors introduced by said channel;

storing information specifying a signal degradation function that measures the signal degradation that occurs if a symbol having the value I is replaced by symbol having a value J; and parsing said received signal into phrases and generates said processed signal, wherein one of said symbols is changed from a value of I to a value of J in a context of that symbol if said replacement would reduce the estimated overall signal degradation in said processed signal relative to said noise-free signal as measured by said signal degradation function and an observed frequency of said context followed by each possible symbol value, said context including a sequence from the beginning of a phrase associated with that symbol to a symbol in that phrase corresponding to that one of said symbols.

8. The method of claim 7 further comprising storing a database having information specifying sequences of symbols immediately preceding a symbol that have been received prior to processing that symbol.

9. The method of claim 8 wherein said database comprises a tree-structured database in which each node represents a sequence of symbols that ends on that node.

10. The method of claim 8 wherein said database is constructed as said symbols in said received signal are received.

11. The method of claim 8 wherein each symbol is processed after all of said received signal has been received.

12. The method of claim 8 wherein each symbol in the received signal is processed as that symbol is received.

13. The method of claim 7 further comprising storing at least a portion of said received signal.

14. A computer readable medium encoded with a data processing program for processing a received signal comprising a noise-free signal that has been corrupted by a channel to generate a processed signal, said data processing program causing a data processing system:

to store a channel corruption function specifying the frequency of errors introduced by said channel;

to store information specifying a degradation function measuring the degradation resulting from changing a symbol having the value I to a symbol having a value J; and to parse said received signal into phrases and generates said processed signal, said controller changing one of said symbols from a value of I to a value of J in a context of that symbol if said replacement would reduce the estimated overall signal degradation in said processed signal relative to said noise-free signal as measured by said signal degradation function and an observed frequency of said context followed by each possible symbol value, said context including a sequence from the beginning of a phrase associated with that symbol to a symbol in that phrase corresponding to that one of said symbols.

15. The computer readable medium of claim 14 wherein said data processing program further causes said data processing system to store a database having information specifying sequences of symbols immediately preceding a symbol that have been received prior to processing that symbol.

16. The computer readable medium of claim 15 wherein said database comprises a tree-structured database in which each hode represents a sequence of symbols that ends on that node.

17. The computer readable medium of claim 15 wherein said database is constructed as said symbols in said received signal are received.

18. The computer readable medium of claim 15 wherein each symbol is processed after all of said received signal has been received.

19. The computer readable medium of claim 15 wherein each symbol in the received signal is processed as that symbol is received.

20. The computer readable medium of claim 14 wherein said data processing program further causes said data processing system to store at least a portion of said received signal.

* * * * *

UNITED STATES PATENT AND TRADEMARK OFFICE
CERTIFICATE OF CORRECTION

PATENT NO. : 7,433,427 B2
APPLICATION NO. : 11/000212
DATED : October 7, 2008
INVENTOR(S) : Erik Ordentlich et al.

It is certified that error appears in the above-identified patent and that said Letters Patent is hereby corrected as shown below:

In column 14, line 6, in Claim 16, delete "hode" and insert -- node --, therefor.

Signed and Sealed this

Tenth Day of March, 2009

JOHN DOLL
*Acting Director of the United States Patent and Trademark Office*